United States Patent
Thakur et al.

(10) Patent No.: US 8,666,461 B2
(45) Date of Patent: Mar. 4, 2014

(54) WIRELESS AUDIO DEVICE CALL DEVICE SELECTION

(75) Inventors: Rajiv Thakur, Framingham, MA (US); Kevin P. Annunziato, Medway, MA (US); Linshi Li, Newton, MA (US)

(73) Assignee: Bose Corporation, Framingham, MA (US)

( * ) Notice: Subject to any disclaimer, the term of this patent is extended or adjusted under 35 U.S.C. 154(b) by 129 days.

(21) Appl. No.: 13/245,478

(22) Filed: Sep. 26, 2011

(65) Prior Publication Data
US 2012/0252541 A1 Oct. 4, 2012

Related U.S. Application Data

(60) Provisional application No. 61/387,447, filed on Sep. 28, 2010, provisional application No. 61/387,454, filed on Sep. 28, 2010.

(51) Int. Cl.
*H04B 1/38* (2006.01)
*H04B 7/00* (2006.01)

(52) U.S. Cl.
USPC .................. 455/574; 455/41.2; 455/569.1

(58) Field of Classification Search
USPC .......... 455/41.1, 41.2, 41.3, 556.1, 569.1, 574
See application file for complete search history.

(56) References Cited

U.S. PATENT DOCUMENTS

| 7,233,808 B2* | 6/2007 | Mooney et al. ............. 455/569.1 |
| 7,778,601 B2* | 8/2010 | Seshadri et al. ............. 455/41.2 |
| 8,112,037 B2* | 2/2012 | Ketari ........................... 455/41.3 |
| 8,271,662 B1* | 9/2012 | Gossweiler et al. .......... 709/227 |
| 8,295,766 B2* | 10/2012 | Zimbric et al. .............. 455/41.2 |
| 8,391,792 B2* | 3/2013 | Glezerman et al. .......... 455/41.2 |
| 8,428,666 B2* | 4/2013 | Kim ........................... 455/575.2 |

FOREIGN PATENT DOCUMENTS

WO 2008130456 A1 10/2008
WO 2009032571 A1 3/2009

OTHER PUBLICATIONS

International Search Report and Written Opinion dated Dec. 7, 2011 for International application No. PCT/US2011/053443.
International Preliminary Report on Patentability dated Apr. 2, 2013 for International application No. PCT/US2011/053443.

* cited by examiner

*Primary Examiner* — Quochien B Vuong

(57) ABSTRACT

A wireless two-way communications headset is able to enter into a partial power mode in which a latching or non-momentary power switch has been operated to an "on" state, but in which there has been a lack of user operation of the headset for more than a predetermined period of time, and in this partial power mode, a processing device of the headset monitors manually-operable controls for an indication of their being operated by a user in a manner indicating a user's intent to engage in audio communications. In response to this indication, the headset enters a higher power mode in which a wireless link with another wireless device is formed and then performs the function intended by the user. In being operated by a user to initiate audio communications with another wireless device (e.g., making a telephone call), the wireless headset first attempts to do so with the wireless device with which the wireless headset most recently engaged in audio communications, and failing that, the wireless headset then attempts to do so with second-most recent wireless device with which the wireless headset engaged in audio communications.

5 Claims, 6 Drawing Sheets

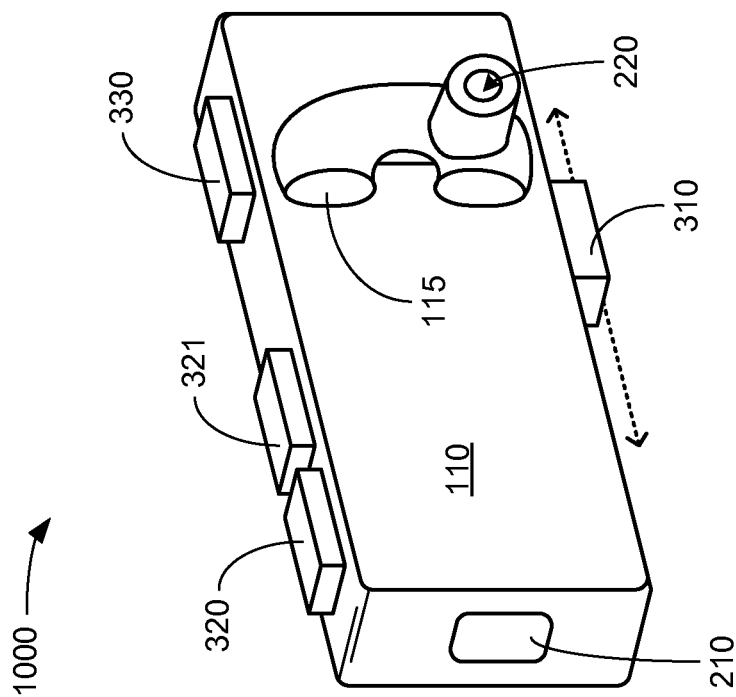
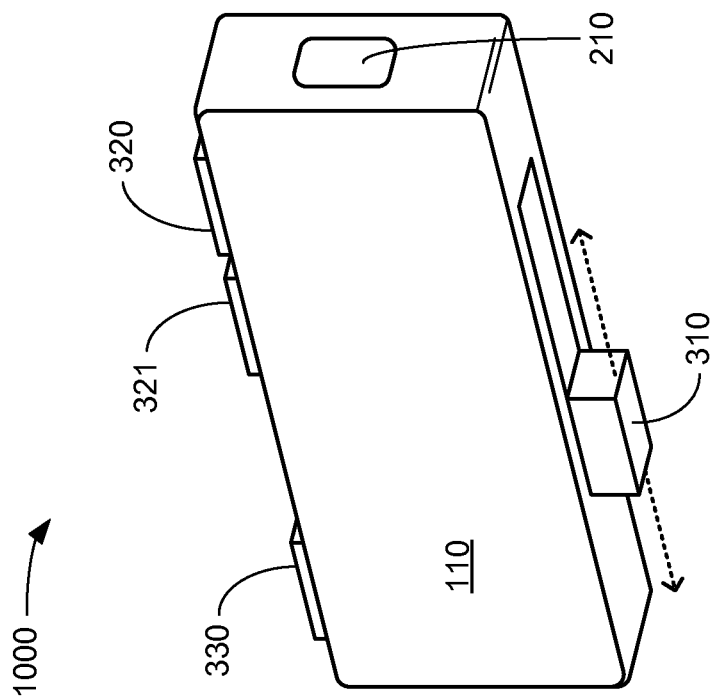

WIRELESS AUDIO DEVICE CALL DEVICE SELECTION

CROSS-REFERENCE TO RELATED APPLICATIONS

This application claims the benefit of U.S. Provisional Application Ser. No. 61/387,447 entitled WIRELESS AUDIO DEVICE POWER-ON CONTROL RESPONSES filed Sep. 28, 2010 by Rajiv Thakur, Linshi Li and Kevin P. Annunziato; and this application claims the benefit of U.S. Provisional Application Ser. No. 61/387,454 entitled WIRELESS AUDIO DEVICE CALL DEVICE SELECTION filed Sep. 28, 2010 by Rajiv Thakur, Linshi Li and Kevin P. Annunziato; the disclosures of both of which are incorporated herein by reference.

TECHNICAL FIELD

This disclosure relates to various responses a wireless audio device provides to user operation of its manually-operable controls, including changing between power modes and selecting a wireless device (e.g., a cellular telephone) as part of making a phone call.

BACKGROUND

Battery-powered wireless two-way communications headsets are in increasingly common use, especially wireless headsets designed to be "paired" with one or more cellular telephones to provide a user of both one of these headsets and a telephone with the ability to engage in "hands-free" telephone communications. To enable this, such headsets often need to be physically small and lightweight in their design to enable them to be comfortably worn on a user's head in a manner that positions at least one acoustic driver in the vicinity of at least one of a user's ears, and positions a microphone in the vicinity of a user's mouth. Numerous physical configurations have been created and offered to users over many years, including various varieties having over-the-head headbands, behind-the-neck napebands, clips to grip a portion of an earlobe, wire loops to wrap around and behind an earlobe, various tube-like or conical in-ear ear couplings extending partly into an ear canal, etc.

Unfortunately, despite the extremely wide variety of physical configurations, the common requirements to all of them of being lightweight and physically small usually results in relatively small batteries being used, such that the amount of time during which a wireless headset is able to remain fully turned on (i.e., in a higher power mode) is usually quite limited. Thus, such a headset is usually designed to enter into a lower power mode after some period of time has passed with no use of that headset. More unfortunately, those same common requirements of being lightweight and small also usually results in relatively few and relatively small manually-operable controls being provided such that user operation of such headsets tends to be made less convenient, especially as it is commonplace for manually-operable controls to be positioned in hard-to-reach and/or hard-to-see locations on the casings of such headsets. Thus, the common practice of requiring users to first operate a manually-operable control to cause a headset to enter a higher power mode from a lower power mode after a long period of inactivity has caused the headset to enter a lower power mode, followed by further requiring users to operate a manually-operable control to then cause the headset to do what is desired by the user (e.g., make a phone call), can be quite inconvenient.

Further, it has become commonplace for wireless headsets to be configurable to be able to form and maintain secure point-to-point wireless links with more than one cellular telephone (or other wireless device able to be employed with a wireless headset to make and/or receive phone calls, e.g., an IP telephony device). Yet, those same common requirements of being lightweight and small, again, usually leads to there being relatively few manually-operable controls by which a user could manually select which wireless device to use with a wireless headset at a given time to make a call. In answer to this, it has become commonplace for a wireless headset to default to selecting the first one of what may be multiple wireless devices with which that wireless headset was configured to form a secure point-to-point link (i.e., the first wireless device with which the headset was put through a "pairing" procedure). Unfortunately, not every user of a headset is able to remember which of their wireless devices was the one that was first "paired" with that headset, and as time passes and the user replaces various ones of their wireless devices, the user may no long wish to use the wireless device with which that headset was first paired as the default selection.

SUMMARY

A wireless two-way communications headset is able to enter into a partial power mode in which a latching or non-momentary power switch has been operated to an "on" state, but in which there has been a lack of user operation of the headset for more than a predetermined period of time, and in this partial power mode, a processing device of the headset monitors manually-operable controls for an indication of their being operated by a user in a manner indicating a user's intent to engage in audio communications. In response to this indication, the headset enters a higher power mode in which a wireless link with another wireless device is formed and then performs the function intended by the user. In being operated by a user to initiate audio communications with another wireless device (e.g., making a telephone call), the wireless headset first attempts to do so with the wireless device with which the wireless headset most recently engaged in audio communications, and failing that, the wireless headset then attempts to do so with second-most recent wireless device with which the wireless headset engaged in audio communications.

Other features and advantages of the invention will be apparent from the description and claims that follow.

DESCRIPTION OF THE DRAWINGS

FIGS. 1a and 1b are different perspective views of a first wireless two-way communications headset.

DETAILED DESCRIPTION

Figure 2:
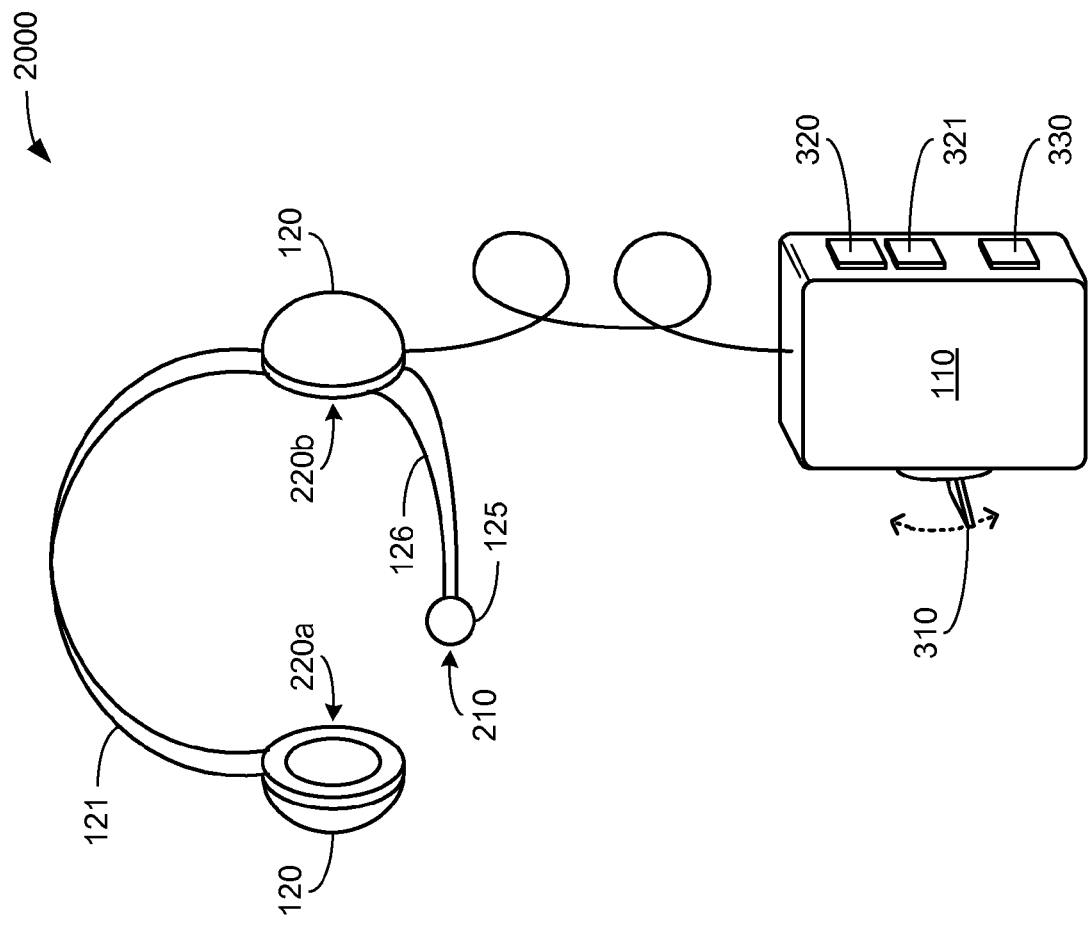
FIG. 2 is a perspective diagram of a second wireless two-way communications headset.

What is disclosed and what is claimed herein is intended to be applicable to a wide variety of headsets, i.e., audio devices structured to be worn on or about a user's head in a manner in which at least one acoustic driver is positioned in the vicinity of an ear, and in which a microphone is positioned in the vicinity of the user's mouth to enable two-way audio communications. It should be noted that although specific embodiments of wireless headsets are presented with some degree of detail, such presentations of specific embodiments are intended to facilitate understanding through examples, and should not be taken as limiting either the scope of disclosure or the scope of claim coverage.

It is intended that what is disclosed and what is claimed herein is applicable to headsets that also provide active noise reduction (ANR), passive noise reduction (PNR), or a combination of both. It is intended that what is disclosed and what is claimed herein is applicable to headsets structured to be connected with a vehicle intercom system through a wired connection and/or structured to be connected wireless devices (devices operable through the headset to make a phone call) through wired and/or wireless connections. It is intended that what is disclosed and what is claimed herein is applicable to headsets having physical configurations structured to be worn in the vicinity of either one or both ears of a user, including and not limited to, over-the-head headsets with either one or two earpieces, behind-the-neck headsets, two-piece headsets incorporating at least one earpiece and a physically separate microphone worn on or about the neck, as well as hats or helmets incorporating earpieces and a microphone to enable audio communication. Still other embodiments of headsets to which what is disclosed and what is claimed herein is applicable will be apparent to those skilled in the art.

FIGS. 1a and 1b are perspective views, from different angles, of a wireless two-way communications headset 1000. In a manner that will be familiar to those skilled in the art, during audio communications, the headset 1000 both receives digital data representing sounds to be acoustically output by an acoustic driver 220 from another wireless device (e.g., a cellular telephone, not shown), and outputs other digital data representing sounds detected by a microphone 210 to that other wireless device. Both transfers of digital data occur through a secure wireless link formed between the headset 1000 and that other wireless device. Regarding its physical configuration, the headset 1000 incorporates a casing 110 carrying an ear coupling 115, the microphone 210, the acoustic driver 220, a manually-operable control 310 serving as a power switch, a manually-operable control 320 (that may serve, for example, as a "dial" button to initiate an outgoing telephone call), a manually-operable control 321 (that may serve, for example, as an "answer" button to answer an incoming telephone call), and still another manually-operable control 330 serving any of a variety of other possible functions associated with initiating, engaging in or concluding audio communications between the wireless headset 1000 and another wireless device (e.g., a mute button, an "end" button to complete a telephone call, etc.).

The shape and size of the casing 110 and the ear coupling 115 are meant to enable the headset 1000 to be worn by a user at a position adjacent one of their ears with a portion of the ear coupling 115 positioned just outside the entrance to the ear canal engaging portions of the outer ear, and with another portion of the ear coupling protruding partly into the ear to convey sounds acoustically output by the acoustic driver 220 into the ear canal. With the headset 1000 so positioned, the casing 110 is meant to be oriented to extend somewhat forward of that ear (i.e., towards the front of the user's head from that ear) so as to position the microphone 210 somewhat forward of that ear and towards the vicinity of the user's mouth to enable the microphone 210 to more effectively detect speech sounds uttered by the user.

The manually-operable control 310 is meant to differ in its manner of operation from the other manually-operable controls 320, 321 and 330 insofar as the manually-operable control 310 is designed to be a "mechanically-latching" or "non-momentary" switch, whereas the other manually-operable controls 320, 321 and 330 are "non-latching" or "momentary" switches. Put another way, the other manually-operable controls 320, 321 and 330 are spring-biased in some manner such that they have a distinct physical non-operated state when not at all touched by a user. More particularly, as depicted in FIGS. 1a-b, the other manually-operable controls 320, 321 and 330 are each button switches that have a distinct non-depressed position to which they are spring-biased when not touched by a user, and that have a distinct depressed position when operated by a user. In contrast, the manually-operable control 310 has two distinct states, with no spring-biasing towards either state from the other of either state, and allowing the user to operate the manually-operable control 310 to put it in either of those two states with the manually-operable control 310 remaining in the state into which the user put it until the user acts to again change the state. More particularly, as depicted in FIGS. 1a-b, the manually-operable control 310 is a slide switch with a manually-operable handle able to be moved along the path indicated by the dotted arrow lines between at least two positions (i.e., at least two states). Thus, given that the manually-operable control 310 serves as a power switch, the manually-operable control 310 is able to be operated to be placed in either an "on" state or an "off" state.

FIG. 2 is a perspective view of a wireless two-way communications headset 2000. Like the headset 1000 of FIGS. 1a-b, the headset 2000 both receives digital data representing sounds to be acoustically output by an acoustic driver 220 from another wireless device (e.g., a cellular telephone, not shown) and outputs other digital data representing sounds detected by a microphone 210 to that other wireless device. However, the headset 2000 may additionally be capable of exchanging such sounds with a wired audio device (not shown) via a wired connection, perhaps a vehicle intercom system or perhaps a radio frequency (RF) audio communications device configured to work with headsets via a wired coupling. Regarding its physical configuration, the headset 2000 incorporates a casing 110 carrying the manually-operable controls 310, 320, 321 and 330 in a manner somewhat like the casing 110 of the headset 1000. However, the headset 2000 also incorporates two additional casings 120, one each of which carries one of a pair of acoustic drivers 220a and 220b (versus the single acoustic driver 220 of the headset 1000), and the headset 2000 further incorporates an additional casing 125 incorporating the microphone 210. The headset 2000 further incorporates a headband 121 coupling the pair of casings 120, a microphone boom 126 coupling the casing 125 to one of the casings 120, and a cable coupling one of the casings 120 to the casing 110.

Like the headset 1000, on the headset 2000, the manually-operable control 310 serves as a power switch, the manually-operable control 320 may serve as a "dial" button, the manually-operable control 321 may serve as an "answer" button, and the other manually-operable control 330 may serve any of a variety of other possible functions associated with initiating, engaging in or concluding audio communications (e.g., telephone calls) between the headset 2000 and another wireless audio device. However, the manually-operable control 310 of the headset 2000 differs from that of the headset 1000 insofar as the manually-operable control 310 of the headset 2000, as depicted in FIG. 2, is a paddle switch with a manually-operable handle able to be moved along the arcuate path indicated by the curved and dotted arrow lines between at least two positions (i.e., at least two states). Thus, again, the manually-operable control 310 is able to be operated to be placed in either an "on" state or an "off" state.

The shape and size of the casing 110, the casing 125 and both of the casings 120, as well as the manner in which they are coupled, are meant to enable the headset 2000 to be worn partly as an over-the-head headset, wherein the casing 110 is meant to be suspended from one of the casings 120 by the cable, clipped (or otherwise attached) to a portion of a user's clothing, or clipped (or otherwise attached) to a portion of the structure of a vehicle the user may be within. Each of the casings 120 are meant to position one of the acoustic drivers 220a and 220b at locations adjacent different ones of the user's ears, and the microphone boom 126 is meant to cooperate with the casing 125 and one of the casings 120 to position the microphone 210 in the vicinity of the user's mouth.

Figure 3:
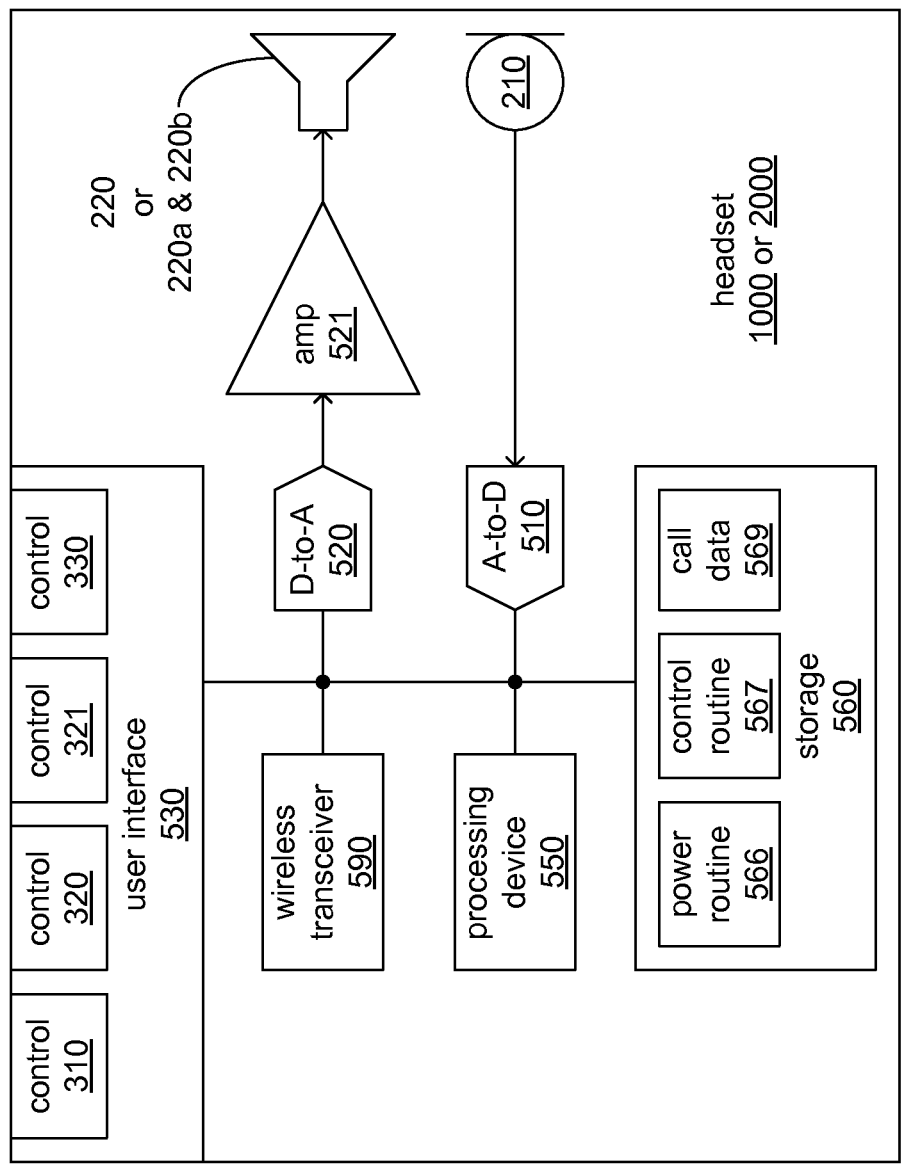
FIG. 3 is a block diagram of a possible electrical architecture of either the wireless headsets of FIGS. 1a-b or of FIG. 2.

FIG. 3 is a block diagram of a possible electrical architecture that may be employed by either of the headsets 1000 or 2000, in which a processing device 550 executes sequences of code to at least coordinate the performance of various functions carried out by the components of either of the headsets 1000 or 2000. In employing this electrical architecture, one or the other of the headsets 1000 or 2000 additionally incorporates an analog-to-digital (A-to-D) converter 510; a digital-to-analog converter (D-to-A) 520; an amplifier 521; a user interface that incorporates the manually-operable controls 310, 320, 321 and 330; the processing device 550; a storage 560 and a wireless transceiver 590. The processing device 550 is coupled at least to each of the A-to-D 510, the D-to-A 520, the user interface 530, the storage 560 and the wireless transceiver 590 to at least coordinate the actions of each in performing various functions.

During normal operation of either of the headsets 1000 or 2000 in which the electrical architecture depicted in FIG. 3 is employed, there is a lower power mode in which no audio communications may be initiated (e.g., not telephone calls may be made or answered), a standby power mode in which audio communications may be initiated (e.g., telephone calls may be made or answered), and a higher power mode in which audio communications either is in progress or was recently in progress. The processing device 550 accesses the storage 560 to retrieve and execute a sequence of instructions of the power routine 566 in preparation to responding to a user's actions by causing the state of either the headset 1000 or 2000 to be changed among these power modes.

Where a user has operated the manually-operable control 310 to its "off" state, the processing device 550 is caused by the power routine 566 to respond by changing the state of the headset 1000 or 2000 to the lower power mode in which all ability to initiate or engage in audio communications is disabled. The processing device 550 is caused to disable and/or remove power from at least some of the A-to-D 510, the D-to-A 520, the amplifier 521 and the wireless transceiver 590 to prevent the consumption of power in wirelessly exchanging digital data with another wireless device, acoustically outputting sounds via the acoustic driver 220 (of the headset 1000) or 220a-b (of the headset 2000), and detecting sounds via the microphone 210. The processing device 550 places itself into a mode of operation in which it consumes a minimal amount power to do little more than to monitor the state of the manually-operable control 310 for an instance of a user operating it to its "on" state. While awaiting such operation of the manually-operable control 310, the processing device 550 is caused to ignore any manual operation of any of the other manually-operable controls 320, 321 and 330. Further, with the wireless transceiver 590 having been disabled and/or deprived of electric power by the processing device 550, whatever wireless links that may have existed between the headset 1000 or 2000 and any other wireless devices are lost.

Where a user has operated the manually-operable control 310 to its "on" state, the processing device 550 is caused by the power routine 566 to respond by changing the state of the headset 1000 or 2000 between the partial and higher power modes in which the ability to initiate and engage in audio communications is enabled. Where a user is currently employing the headset 1000 or 2000 in engaging in audio communications, the processing device 550 is caused to maintain the higher power mode. In the higher power mode, all of the A-to-D 510, the D-to-A 520, the amplifier 521 and the wireless transceiver 590 are provided with power and enabled to support a user conducting audio communications with another wireless device via a wireless link (possibly, as part of using the headset 1000 or 2000 with that other wireless device to conduct a telephone conversation). During the higher power mode, the processing device 550 is caused by the power routine 566 to execute a sequence of instructions of the control routine 567 to form wireless links with other wireless devices (e.g., cellular telephones), to maintain those wireless links in readiness for quickly responding to indications of a user intending to initiate audio communications, and to respond to user operation of at least the manually-operable controls 320 and 321 that provide the indications of a user intending to initiate particular forms of audio communication, such as making or answering a telephone call. With the wireless transceiver 590 both provided with power and enabled by the processing device 550, the wireless transceiver 590 is able to be operated by the processing device 550 to form and maintain wireless links with other wireless devices, as dictated by the control routine 567. On occasions where a user operates one or the other of the manually-operable controls 320 or 321 to initiate audio communications (e.g., make or answer a telephone call), the processing device 550 is caused by the control routine 567 to implement whatever action was indicated by the user's operation of either of the manually-operable controls 320 and 321.

However, where a user does not employ the headset 1000 or 2000 in initiating or conducting audio communications for more than a predetermined period of time, the processing device 550 is caused to change the state of the headset 1000 or 2000 to the partial power mode. The partial power mode resembles the lower power mode in many ways, including the disabling and/or removing of power from at least some of the A-to-D 510, the D-to-A 520, the amplifier 521 and the wireless transceiver 590 to prevent the consumption of power in wirelessly exchanging digital data with another wireless device, acoustically outputting sounds via the acoustic driver (s) 220 (of the headset 1000) or 220a-b (of the headset 2000), and detecting sounds via the microphone 210. As in the lower power mode, the wireless transceiver 590 is again disabled and/or deprived of electric power by the processing device 550, causing whatever wireless links that may have existed between the headset 1000 or 2000 and any other wireless devices to be lost. However, the partial power mode differs from the lower power mode in that the processing device is caused by the power routine 566 to monitor the state of more than just the manually-operable control 310. In addition to monitoring the manually-operable control 310 for an instance of a user operating it to its "off" state, the processing device 550 is caused to also monitor one or both of the manually-operable controls 320 and 321 for instances of a user operating one or the other to in various ways initiate audio communications (e.g., make a telephone call or answer a telephone call, respectively). Thus, the processing device 550 is caused to consume a little more electric power during the partial power mode as a result of monitoring more than one manually-operable control, and perhaps with shorter intervals between instances of polling the state of those manually-operable controls to provide quicker responses to a user's actions during the partial power mode than may be seen as necessary or desirable during the lower power mode when only the manually-operable control 310 is monitored.

During partial power mode, if a user operates either of the manually-operable controls 320 or 321 to initiate audio communications (i.e., to either make or answer a telephone call, respectively), the processing device 550 is caused by the power routine 566 to respond by first placing the headset 1000 or 2000 into the higher power mode, where the power routine 566 causes the processing device to begin executing a sequence of instructions of the control routine 567. In turn, the control routine 567 causes the processing device to operate the wireless transceiver 590 to once again form wireless links with one or more other wireless devices, and then causes the processing device 550 to operate the wireless transceiver 590 to implement whatever action was indicated by the user's operation of either of the manually-operable controls 320 or 321. In this way, a user is not required to take steps to first ascertain whether the headset 1000 or 2000 is in one or the other of the partial power mode and the higher power mode before operating one or more manually-operable controls to initiate some form of audio communications. Instead, a user simply operates the appropriate one of the manually-operable controls 320 or 321 without regard to which of these power modes is the current power mode of the headset 1000 or 2000, and the processing device 550 acts to change power modes where needed and acts to implement the user's desired action. It is intended, therefore, that the transition from the partial power mode to the higher power mode be relatively unobtrusive from the perspective of a user, perhaps causing a slight delay before audio communications (e.g., a telephone call) is actually initiated versus where the higher power mode is already the current power mode.

It should be noted that despite the presentation of the headsets 1000 and 2000, as well as the possible electrical architecture in FIG. 3 for these headsets, with repeated and rather specific references towards their use with cellular telephones as the example of a wireless device and in conducting telephone calls as the example of a wireless communication, it is to be understood that the headsets 1000 and 2000 may be used with other types of wireless devices to conduct other types of audio communication. By way of example, either of these headsets may be used such that they form wireless links with one or more intercom system devices to enable two-way audio communications through an intercom system with other persons in a building or vehicle; may be used such that they form wireless links with one or more audio recording/playing devices to enable one-way or two-way audio communications in which at least a recording is played to a user of one of these headsets; or may be used such that they form wireless links with one or more computer systems or video game systems to enable two-way audio communications with other participants in a multi-person game carried out across a network to which each person has access through a computer system or game system with which each person may use a headset such as one of the headsets 1000 or 2000.

It should be noted that despite the presentation of the manually-operable controls 320, 321 and 330 with repeated and rather specific references towards serving particular purposes, it is to be understood that each of these manually-operable controls 320, 321 and 330 may have somewhat different functions that are still in the spirit of what has been specifically referred to, or may have entirely different functions that still in some way enable a user to initiate some form of audio communications. By way of example, where one of the headsets 1000 or 2000 is being employed by a user with an intercom system, one or more of these manually-operable controls may serve as a push-to-talk (PTT) button.

Figure 4:
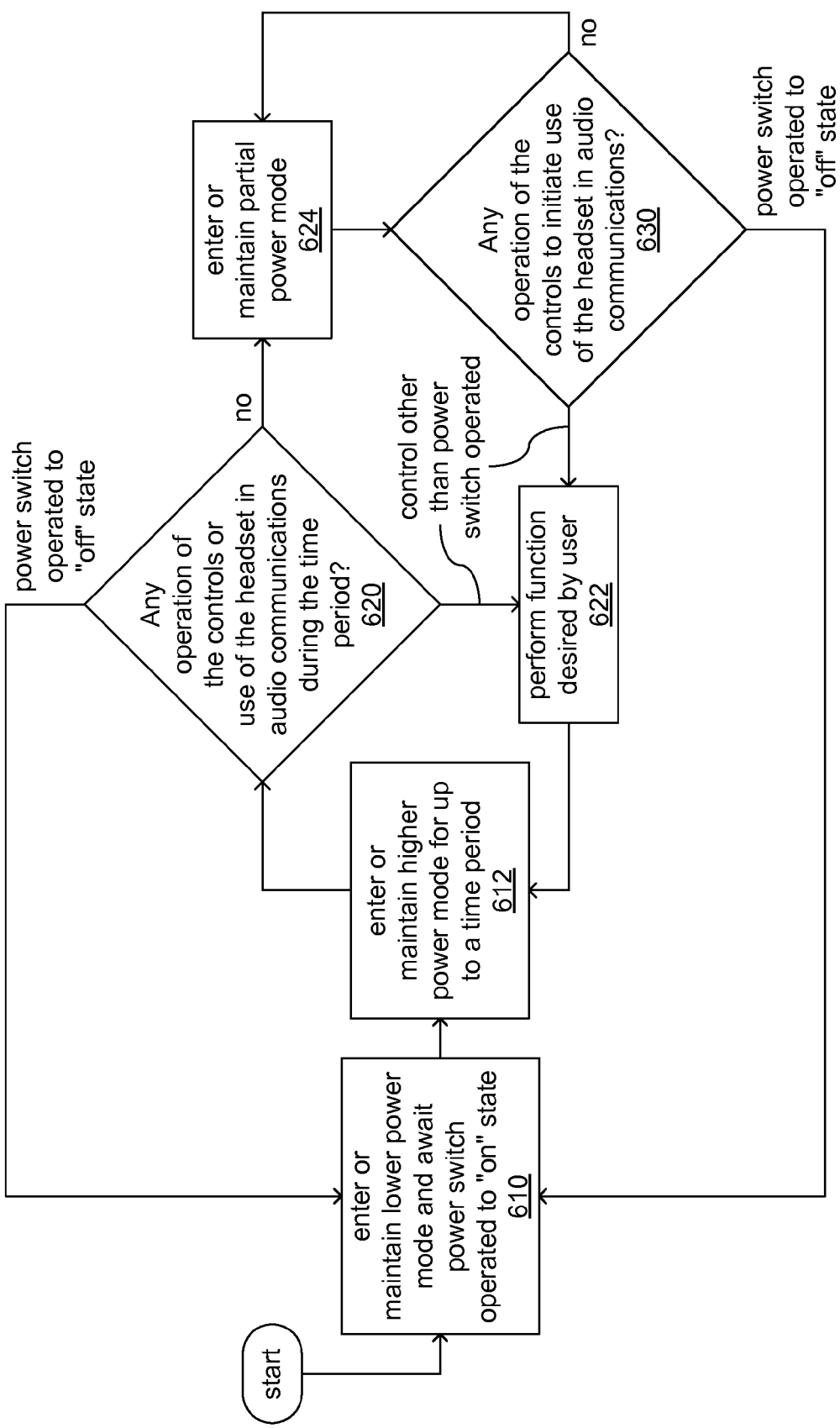
FIG. 4 is a flowchart of a possible approach to conserving power for the either of the wireless headsets of FIGS. 1a-b or of FIG. 2.

FIG. 4 is a flowchart of a possible manner in which one or the other of the headsets 1000 or 2000, perhaps as part of employing a variant of the architecture depicted in FIG. 3, engages in changing power modes in response to a user's actions. Starting at 610, one of the headsets 1000 or 2000 (hereinafter referred to as "this headset" for purposes of discussing FIG. 4) is in the lower power mode, the processing device 550 having been caused by the power routine 566 to place this headset in the lower power mode in response to a user having operated the power switch (e.g., the manually-operable control 310) to its "off" state. In this lower power mode, the processing device 550 is further caused to monitor solely the power switch for an instance of a user operating it to its "on" state. At 612, in response to that instance of a user operating the power switch to its "on" state, the processing device is caused to place this headset into the higher power state in which the processing device 550 also executes a sequence of instructions of the control routine 567, thereby causing the processing device 550 to await an instance of further operation of a manually-operable control (perhaps, one of the manually-operable controls 320, 321 or 330) by a user to take some form of action regarding audio communications (e.g., initiating an audio communication, perhaps by dialing or answering a telephone call) for up to a predetermined time period.

At 620, if the user has not operated any of the manually-operable controls (at least in a way to take some form of action regarding audio communications), but has operated the power switch back to its "off" state, then the processing device 550 is caused to respond by placing this headset back into the lower power state at 610. However, if at 620, the user has operated one of the manually-operable controls (at least in a way to take some form of action regarding audio communications), then the processing device 550 is caused to perform the function indicated by the user's operation of manually-operable controls (e.g., operating the wireless transceiver to initiate audio communications) at 622, and is then caused to return to await another instance of further operation of a manually-operable control at 612.

However, if at 620, the predetermined time period has elapsed without the user operating any of the manually-operable controls (at least in a way to take some form of action regarding audio communications), and the user has also not operated the power switch to its "off" position, then the processing device 550 places this headset into the partial power mode at 624, and awaits an instance in which the user does operate one of the manually-operable controls (at least in a way to take some form of action regarding audio communications) at 624 and 630. If such operation of any of the manual controls occurs at 630, the processing device 550 is caused to continue awaiting such operation at 624.

Alternatively, at 630, if the user has not operated any of the manually-operable controls (at least in a way to take some form of action regarding audio communications), but has operated the power switch back to its "off" state, then the processing device 550 is caused to respond by placing this headset back into the lower power state at 610. However, if at 630, the user has operated one of the manually-operable controls (at least in a way to take some form of action regarding audio communications), then the processing device 550 is caused to perform the function indicated by the user's operation of manually-operable controls (e.g., operating the wireless transceiver to initiate audio communications) at 622, and is then caused to return to await another instance of further operation of a manually-operable control at 612.

Figure 5:
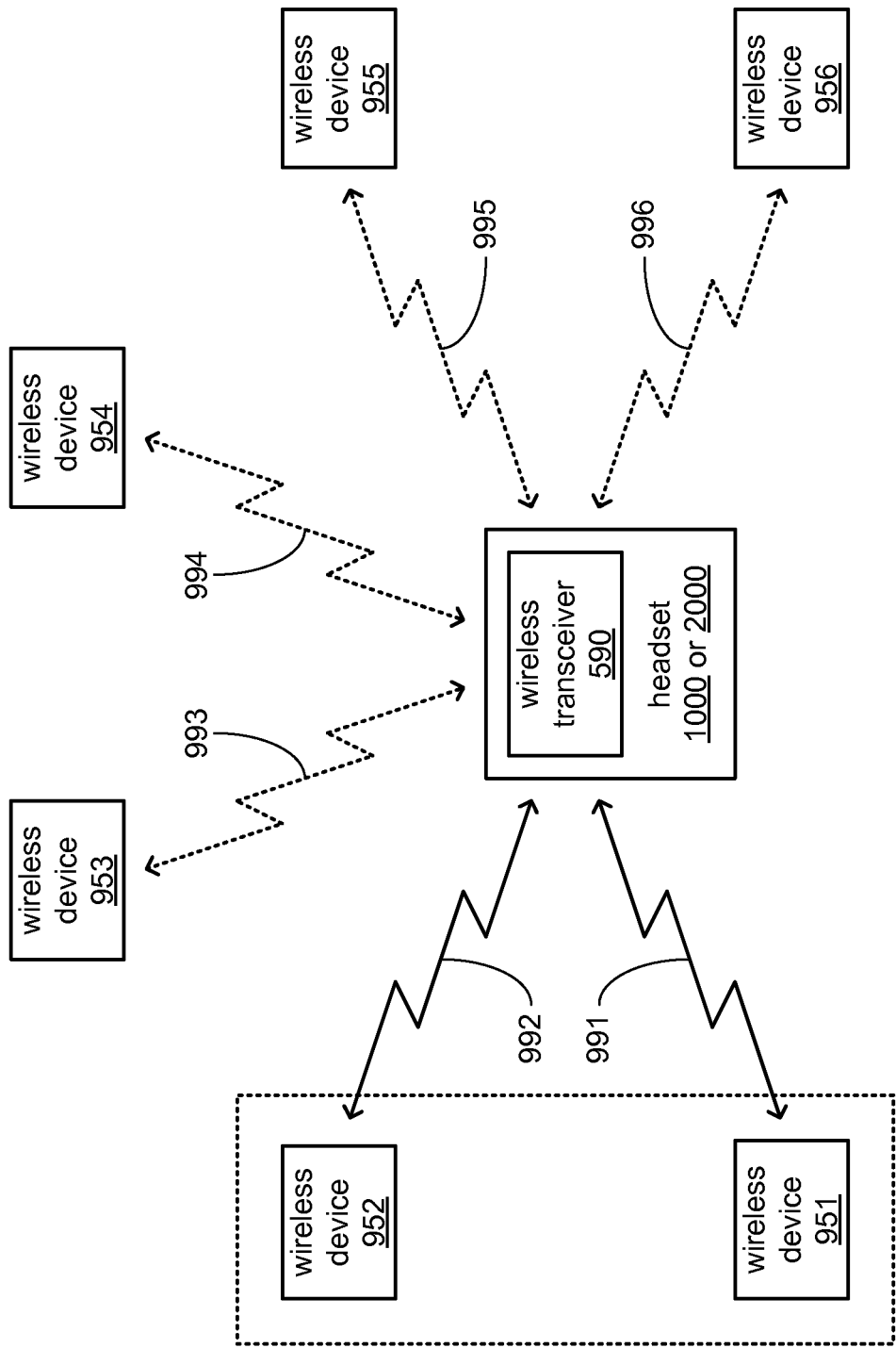
FIG. 5 is a block diagram of preparations made for communications with multiple possible wireless devices for either of the wireless headsets of FIGS. 1a-b or of FIG. 2.

FIG. 5 is a block diagram depicting the possibility of one or the other of the headsets 1000 or 2000 being prepared for forming wireless links with up to six different possible devices 951 through 956, though perhaps not with all six at the same time. As will be familiar to those skilled in the art of employing widely known and used forms of wireless communications between wireless headsets and other devices (including wireless devices meant to be employed in wireless two-way audio communications), it is possible to prepare a single headset to form secure wireless links with multiple other wireless devices. Those skilled in the art of such wireless linkages are likely familiar with such forms of wireless communications as Bluetooth promulgated by the Bluetooth Special Interest Group of Bellevue, Wash.; or ZigBee promulgated by the ZigBee Alliance of San Ramon, Calif. Some of such forms of wireless communications were created with an eye towards enabling the formation of a "personal area network" (PAN) about a user's person among multiple wireless devices that they may be carrying with them at any given time. However, by far the most commonly encountered usage of such forms of wireless communications as these has been relatively simple two-device point-to-point wireless communications between a single headset and a single other wireless device capable of being employed in wireless two-way audio communications (e.g., a cellular telephone).

In such forms of wireless communications, a user of a wireless headset and one or more other wireless devices engages in a procedure commonly referred to as "pairing" in which the wireless headset and another wireless device that the user wishes to use with that headset are essentially "introduced" to each other by placing each of those two wireless devices in a "pairing mode" in which those two wireless devices are caused to exchange identity codes, encryption keys and/or other information that will enable them to recognize each other and to both quickly form and maintain a secure wireless link between them (usually secured via some form of encryption using an encryption key exchanged between them during pairing).

It is possible that a user of a wireless headset may have multiple wireless devices capable of engaging in audio communications that they wish to use with the same wireless headset (e.g., one cellular telephone provided by an employer for work-related purposes, a personal cellular telephone, a computer or game system used in playing multi-person video games, a long range radio frequency communications system built into a vehicle, etc.). Thus, the user may make use of the flexibility afforded by the form of wireless communications common to all of these devices by pairing their wireless headset with each of those other wireless devices. However, while this may prepare their headset and each of those other wireless devices to recognize each other and to both form and maintain secure wireless links with each other, problems can arise where the user attempts to use their wireless headset with a particular one of those wireless devices to initiate audio communications where multiple ones of those other wireless devices are present and forming wireless links with that headset all at the same time. A need arises for either the wireless headset to somehow determine the correct one of the other wireless devices to be used as a default choice, or a mechanism must be provided to enable the user to manually select one.

Returning to FIG. 5, the headset 1000 or 2000 has been paired with all 6 of the wireless devices 951, 952, 953, 954, 955 and 956. As a result, the headset 1000 or 2000 has been prepared to recognize and both form and maintain secure wireless links 991, 992, 993, 994, 995 and 996 with each of the wireless devices 951, 952, 953, 954, 955 and 956, respectively. Of course, it would be rather unusual for the user of the headset 1000 or 2000 to have all of the wireless devices 951-956 in the same vicinity with the wireless headset 1000 or 2000 constantly and/or all at the same time. Further, even if the form of wireless communications employed between all of these devices is able to support it, some embodiments of the headset 1000 or 2000 may not be capable of maintaining all of the links 991-996 at the same time. Thus, it is likely that any given time while the wireless headset 1000 or 2000 is, itself, in the aforedescribed higher power mode, that the wireless headset 1000 or 2000 will not be able to form or maintain all of the wireless links 991-996 constantly or simultaneously as a result of one or more of the wireless devices 951-956 not being in the vicinity or being otherwise incapable of maintaining a wireless link, themselves, perhaps as a result of having entered their own forms of lower power mode.

Also, as depicted via a dotted-line box drawn around the wireless devices 951 and 952, the wireless device 951 is the one of the wireless devices 951-956 with which the wireless headset 1000 or 2000 has most recently been used by the user of all of these wireless devices 951-956 to engage in audio communications, and the wireless device 952 is the second-most recent one of the wireless devices 951-956 to have been used with the wireless headset 1000 or 2000 to engage in audio communications. Indeed, it should be noted that the numbering of wireless devices with the reference numerals 951 through 956 is in order of most recent to least recent use with the wireless headset 1000 or 2000 to engage in audio communications.

To answer the need to minimize occurrences of the user having to operate the manually-operable controls 320, 321 and/or 330 to manually select the desired one of the wireless devices 951-956 for use in the next instance of initiating audio communications (e.g., making or answering a telephone call), the processing device 550 is caused by the control routine 567 to respond to manual operation of one or more of these manually-operable controls by a user to cause the wireless headset 1000 or 2000 to engage in audio communications with one of the wireless devices 951-956 by operating the wireless transceiver 590 to select the one of the wireless devices 951-956 that was most recently used with the wireless headset 1000 or 2000 to carry out audio communication, which as just discussed, is the wireless device 951. In accordance with various ones of the widely used wireless standards, the processing device 550 operates the transceiver 590 to send a signal to the one of these wireless devices that was most recently used to trigger that one of these wireless devices to cooperate with the headset 1000 or 2000 to initiate audio communications.

However, if for some reason, the wireless link 991 between the headset 1000 or 2000 and the wireless device 951 is not already in place or cannot be formed (where it was not already in place), then the processing device 550 is caused to operate the wireless transceiver 590 to select the second-most recent one of the wireless devices 951-956 to have been used with the wireless headset 1000 or 2000 to engage in audio communications, which as just discussed, is the wireless device 952. This is done based on the presumption that the link 991 with the wireless device 951 is not in place or cannot be formed as a result of the user perhaps no longer having the wireless device 951 on their person or as a result of the user having turned the wireless device 951 off due to the user having ceased engaging in audio communications related to a particular subject (e.g., work-related audio communications or audio communications in their personal life). In short, a presumption is made that the user will most likely have with them at any given time only the ones of the wireless devices 951-956 that are appropriate for whatever activities they are engaged in and/or for whatever day or time of day it currently is.

However, if for some reason, the wireless link 992 between the headset 1000 or 2000 and the wireless device 952 is not already in place and cannot be formed, then in some embodiments, the processing device 550 is caused to operate the wireless transceiver 590 to select the third-most recent one of the wireless devices 951-956 to have been used with the wireless headset 1000 or 2000 to engage in audio communications (i.e., the wireless device 953). Alternatively, in other embodiments, the processing device is caused to respond to the lack of the wireless link 992 by taking no action beyond possibly providing the user with an audible and/or visual indication to the effect that the user should initiate whatever audio communications they wish through the controls of whichever one of the wireless devices 951-956 they wish to use. This choice of taking no further action beyond providing the audible and/or visual indication to the user in those other embodiments is based on the presumption that the user is unlikely to remember which one of the wireless devices 951-956 was the third-most recent one of the wireless devices 951-956 to be used with the wireless headset 1000 or 2000 to engage in audio communications, and therefore, may find themselves surprised in a manner that they may deem to be disagreeable by which one of the wireless devices 951-956 is employed under the control of the processing device 550 to carry out the audio communications desired.

Figure 6:
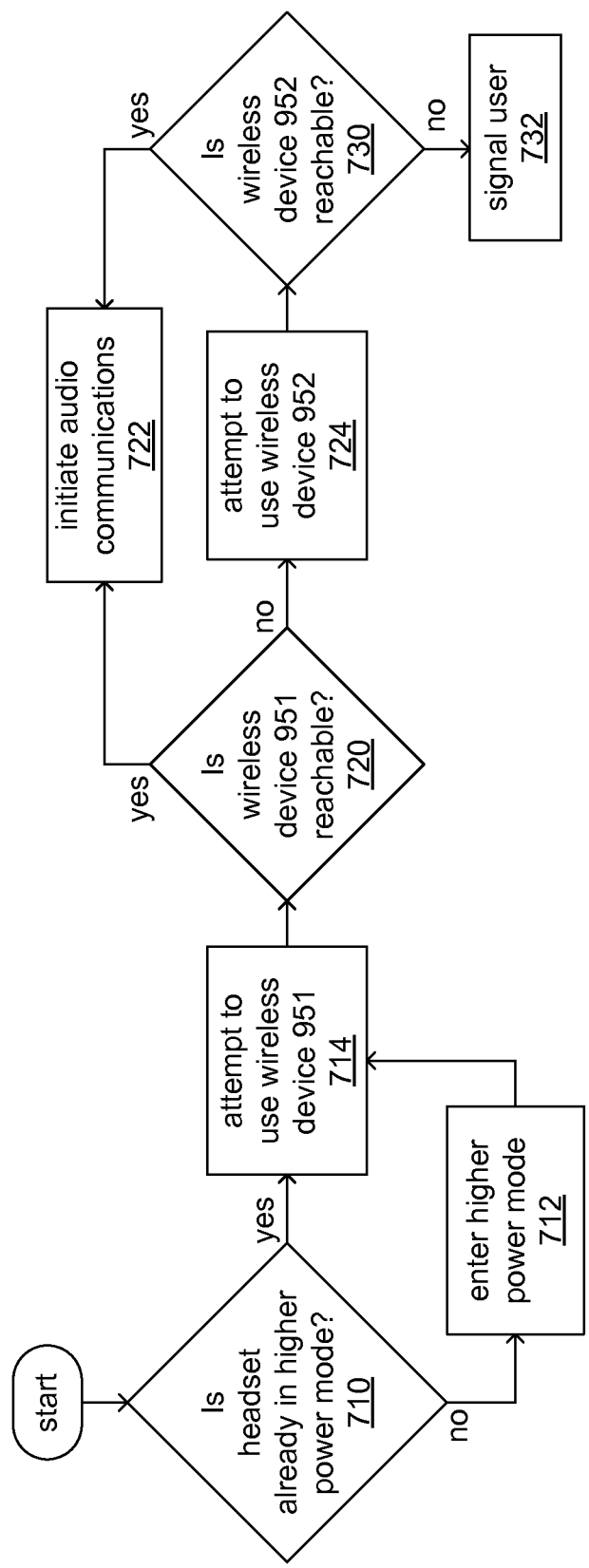
FIG. 6 is a flowchart of a possible approach to selecting a default one of multiple possible wireless devices for engaging in audio communications for either of the wireless headsets of FIGS. 1a-b or of FIG. 2.

FIG. 6 is a flowchart of a possible manner in which one or the other of the headsets 1000 or 2000, perhaps as part of employing a variant of the architecture depicted in FIG. 3, engages in selecting a one of the wireless devices depicted in FIG. 5 for use in carrying out audio communications. Starting at 710, in response to a user having operated one of the manually-operable controls 320, 321 or 330 of one of the headsets 1000 or 2000 (hereinafter referred to as "this headset" for purposes of discussing FIG. 6) to initiate audio communications (e.g., making a telephone call), the processing device 550 is caused by the power routine 566 to place this headset in the higher power mode at 712, if this headset was not already in the higher power mode at 710.

Then, at 714, the processing device is caused by the control routine 567 to operate the wireless transceiver 590 to attempt to use the wireless device 951 to initiate the audio communications as indicated by the user's operation of whichever one of the manually-operable controls 320, 321 or 330. If at 720, the wireless device 951 proved reachable (either through the link 991 already being in place or after forming the link 991), then the processing device is caused to operate the wireless transceiver 590 to carry out the audio communications desired by the user at 722.

However, if at 720, the wireless device 951 proved not to be reachable, then at 724, the processing device 550 is caused by the control routine 567 to operate the wireless transceiver 590 to attempt to use the wireless device 952 to initiate the audio communications desired by the user. If at 730, the wireless device 952 proved reachable (either through the link 992 already being in place or after forming the link 992), then the processing device is caused to operate the wireless transceiver 590 to carry out the audio communications desired by the user at 722.

However, if at 730, the wireless device 952 proved not to be reachable, then at 732, the processing device 550 is caused to provide a signal to the user of the need for the user to take alternate action to initiate the audio communications that the user desires. It may be that the user directly operates one or more manually-operable controls of whichever one of the wireless devices 951 or 952 is present, but is somehow not in a state to be reachable. It may be that the user directly operates one or more manually-operable controls of whichever one of the other wireless devices 953 through 956 may be present to establish a corresponding one of the links 993 through 996 (if not already in place) and/or to initiate the desired audio communications in a manner in whichever one of the wireless devices 953 through 956 that the user chooses is caused to signal this headset to initiate the audio communications, rather than what was earlier attempted, which was to have this headset signal one of the wireless devices 951 and/or 952.

Other implementations are within the scope of the following claims and other claims to which the applicant may be entitled.

The invention claimed is:

1. A headset capable of wireless two-way audio communications comprising:
   a first manually-operable control serving as a power switch, wherein the first manually-operable control comprises a non-momentary switch operable to an on state and an off state;
   a second manually-operable control serving as a control to initiate audio communications between the headset and another wireless device;
   an acoustic driver;
   a microphone;
   a processing device;
   a wireless transceiver accessible to the processing device; and
   a storage accessible to the processing device and storing a sequence of instructions that when executed by the processing device, causes the processing device to:
   in response to the first manually-operable control being operated to the off state, place the headset in a lower power mode, wherein the wireless transceiver is disabled, all use of the microphone and the acoustic driver is disabled, the first manually-operable control is monitored for an instance of the first manually-operable control being operated to the on state, and the second manually operable control is not monitored;
   in response to the first manually-operable control being operated to the on state, place the headset in a higher power mode, wherein the wireless transceiver is enabled, use of the microphone and the acoustic driver is enabled, and the first and second manually-operable controls are monitored for an instance of either being operated for a predetermined period of time;
   in response to the predetermined period of time having elapsed during the higher power state without either of the first and second manually-operable controls being operated, place the headset in a partial power mode wherein the wireless transceiver is disabled, all use of the microphone and the acoustic driver are disabled, and the first and second manually-operable controls are monitored for an instance of either being operated; and in response to the second manually-operable control being operated during the partial power mode, place the headset in the higher power mode and initiate audio communications between the headset and another wireless device.

2. The headset of claim 1, wherein the instructions also cause the processing device to, in response to the first manually-operable control being operated to the on state and the second manually-operable control being operated to initiate audio communications:
operate the wireless transceiver to attempt to reach a first wireless device of a plurality of wireless device with which the headset has been paired, wherein the first wireless device was most recently used with the headset to engage in audio communications of all wireless devices of the plurality of wireless devices;
in response to the first wireless being reachable, engage in audio communications with the first wireless device;
in response to the first wireless device not being reachable, operate the wireless transceiver to attempt to reach a second wireless device of the plurality of wireless device, wherein the second wireless device was next to most recently used with the headset to engage in audio communications of all wireless devices of the plurality of wireless devices after the first wireless device;
in response to the second wireless being reachable and the first wireless device not being reachable, engage in audio communications with the second wireless device;
in response to the first wireless device not being reachable and the second wireless device not being reachable, signal a user of the headset.

3. A method comprising:
in a headset capable of wireless two-way audio communications and having a memory storing a list of wireless devices with which the headset has been paired, the list including at least three devices,
in response to a first manually-operable control of the headset being operated to an on state and a second manually-operable control of the headset being operated to initiate audio communications:
operating a wireless transceiver of the headset to attempt to reach a first wireless device, wherein the first wireless device was most recently used with the headset to engage in audio communications of all wireless devices in the list;
in response to the first wireless being reachable, engaging in audio communications with the first wireless device;
in response to the first wireless device not being reachable, operating the wireless transceiver to attempt to reach a second wireless device, wherein the second wireless device was next to most recently used with the headset to engage in audio communications of all wireless devices in the list after the first wireless device;
in response to the second wireless being reachable and the first wireless device not being reachable, engaging in audio communications with the second wireless device;
in response to the first wireless device not being reachable and the second wireless device not being reachable, signaling a user of the headset and not attempting to reach a third wireless device until instructed by the user.

4. A method comprising:
in response to a first manually-operable control of a headset capable of wireless two-way audio communications being operated to an off state, placing the headset in a lower power mode, wherein a wireless transceiver of the headset is disabled, all use of a microphone and an acoustic driver of the headset is disabled, the first manually-operable control is monitored for an instance of the first manually-operable control being operated to an on state, and a second manually operable control of the headset is not monitored;
in response to the first manually-operable control being operated to the on state, placing the headset in a higher power mode, wherein the wireless transceiver is enabled, use of the microphone and the acoustic driver is enabled, and the first and second manually-operable controls are monitored for an instance of either being operated for a predetermined period of time;
in response to the predetermined period of time having elapsed during the higher power state without either of the first and second manually-operable controls being operated, placing the headset in a partial power mode wherein the wireless transceiver is disabled, all use of the microphone and the acoustic driver are disabled, and the first and second manually-operable controls are monitored for an instance of either being operated; and
in response to the second manually-operable control being operated during the partial power mode, placing the headset in the higher power mode and initiating audio communications between the headset and another wireless device.

5. A headset comprising:
a power switch comprising a manually-operable non-momentary switch;
a communications switch; and
a processor configured to:
in response to the power switch being placed in an off position,
enter a low-power state by disabling a wireless transceiver and audio electronics of the headset, and
monitor the power switch for a change to the on position;
in response to the power switch being placed in the on position,
enter a normal operating state by enabling the wireless transceiver and the audio electronics, and
for a predetermined period of time, monitor both the power switch and the communications switch for operation;
in response to the predetermined period of time elapsing without either the power switch or the communications switch being operated,
enter a stand-by state by disabling the wireless transceiver and the audio electronics, and
monitor both the power switch and the communications switch for operation of either switch; and
in response to the communications switch being operated during the stand-by state, enter the normal operating state and initiate communication between the headset and another wireless device.

* * * * *